United States Patent
Ozzello

(10) Patent No.: US 9,897,116 B2
(45) Date of Patent: Feb. 20, 2018

(54) METHOD OF DETECTING FAILURE OF A SERVO-VALVE, AND A SERVO-VALVE APPLYING THE METHOD

(71) Applicant: IN-LHC, Chateaudun (FR)

(72) Inventor: Guylain Ozzello, La Chapelle Encherie (FR)

(73) Assignee: IN-LHC, Chateaudun (FR)

( * ) Notice: Subject to any disclaimer, the term of this patent is extended or adjusted under 35 U.S.C. 154(b) by 0 days.

(21) Appl. No.: 13/647,924

(22) Filed: Oct. 9, 2012

(65) Prior Publication Data

US 2013/0087223 A1   Apr. 11, 2013

(30) Foreign Application Priority Data

Oct. 10, 2011 (FR) ...................................... 11 59118

(51) Int. Cl.

| | |
|---|---|
| *F16K 11/00* | (2006.01) |
| *F15B 19/00* | (2006.01) |
| *F15B 13/043* | (2006.01) |
| *H02K 11/20* | (2016.01) |
| *H02K 26/00* | (2006.01) |

(52) U.S. Cl.
CPC ........ *F15B 19/005* (2013.01); *F15B 13/0436* (2013.01); *H02K 11/20* (2016.01); *H02K 26/00* (2013.01); *Y10T 137/0318* (2015.04); *Y10T 137/0396* (2015.04); *Y10T 137/2278* (2015.04); *Y10T 137/8158* (2015.04); *Y10T 137/8242* (2015.04); *Y10T 137/8275* (2015.04); *Y10T 137/86598* (2015.04)

(58) Field of Classification Search
CPC .. F02D 9/1065; F02D 11/107; F15B 13/0436; F15B 19/005; F16K 1/221; F16K 31/043; H02K 11/001; H02K 26/00; H02K 11/20; Y10T 137/8158; Y10T 137/2278; Y10T 137/86598; Y10T 137/8659; Y10T 137/86606; Y10T 137/86614; Y10T 137/8663; Y10T 137/0318–137/053; Y10T 137/8225; Y10T 137/8242; Y10T 137/8275

USPC ....... 137/625.61–625.64, 625.66, 1, 14, 551, 137/553, 554, 556; 335/17, 205–207; 251/129.12

See application file for complete search history.

(56) References Cited

U.S. PATENT DOCUMENTS

| | | | | |
|---|---|---|---|---|
| 1,600,775 | A | * | 9/1926 | Peaslee .................. H02K 17/30 318/476 |
| 2,485,094 | A | * | 10/1949 | Gundersen ...................... 137/83 |
| 2,832,318 | A | * | 4/1958 | Paine ....................... 137/625.62 |
| 2,835,265 | A | * | 5/1958 | Brandstadter ................... 137/82 |
| 2,884,907 | A | * | 5/1959 | Atchley ................... 137/625.69 |

(Continued)

FOREIGN PATENT DOCUMENTS

| | | |
|---|---|---|
| EP | 0093348 A2 | 11/1983 |
| EP | 0982503 A2 | 3/2000 |

*Primary Examiner* — Craig J Price
(74) *Attorney, Agent, or Firm* — Sughrue Mion, PLLC

(57) ABSTRACT

A method of detecting failure of a two-stage servo-valve in which the power-controlling movable member is connected to the rotor of a torque motor of a pilot stage by mechanical feedback. A malfunction signal is generated in response to detecting that the rotor of the torque motor has engaged a stop. The invention also provides a servo-valve for implementing such a method.

7 Claims, 2 Drawing Sheets

(56) References Cited

U.S. PATENT DOCUMENTS

| | | | | |
|---|---|---|---|---|
| 2,886,009 | A * | 5/1959 | Myers | 137/625.62 |
| 2,924,241 | A * | 2/1960 | Bauer | 137/625.62 |
| 2,926,696 | A * | 3/1960 | Kolm, Jr. | 137/625.62 |
| 2,942,613 | A * | 6/1960 | Church | G05D 9/12 137/101.21 |
| 2,973,013 | A * | 2/1961 | Myers | 137/625.62 |
| 2,996,072 | A * | 8/1961 | Atchley | 137/83 |
| 3,015,317 | A * | 1/1962 | Buchanan et al. | 137/625.62 |
| 3,017,864 | A * | 1/1962 | Atchley | 137/83 |
| 3,023,782 | A * | 3/1962 | Chaves et al. | 137/85 |
| 3,029,830 | A * | 4/1962 | Klover et al. | 137/82 |
| 3,033,232 | A * | 5/1962 | Bahniuk | 137/625.62 |
| 3,048,678 | A * | 8/1962 | Reed | H01H 51/12 335/80 |
| 3,058,038 | A * | 10/1962 | Stedman, Jr. et al. | 335/229 |
| 3,065,735 | A * | 11/1962 | Chaves, Jr. et al. | 91/387 |
| 3,081,787 | A * | 3/1963 | Meulendyk | 137/83 |
| 3,095,002 | A * | 6/1963 | Healy | 137/85 |
| 3,095,906 | A * | 7/1963 | Kolm, Jr. | 137/625.62 |
| 3,101,650 | A * | 8/1963 | Blanton | 137/625.62 |
| 3,135,294 | A * | 6/1964 | Huber | 137/625.61 |
| 3,176,593 | A * | 4/1965 | Bernstein | 137/625.61 |
| 3,211,063 | A * | 10/1965 | Woodrow | 137/625.62 |
| 3,257,911 | A * | 6/1966 | Garnjost et al. | 137/625.62 |
| 3,270,623 | A * | 9/1966 | Garnjost et al. | 137/625.62 |
| 3,272,077 | A * | 9/1966 | Meulendyk et al. | 137/83 |
| 3,282,283 | A * | 11/1966 | Takeda | 137/625.63 |
| 3,331,383 | A * | 7/1967 | Buchanan | 137/625.64 |
| 3,362,296 | A * | 1/1968 | Gray | 91/3 |
| 3,379,919 | A * | 4/1968 | Wynne | 314/61 |
| 3,385,171 | A * | 5/1968 | Wood | 91/461 |
| 3,390,613 | A * | 7/1968 | Westbury et al. | 91/363 R |
| 3,407,826 | A * | 10/1968 | Wagner | 415/43 |
| 3,429,225 | A * | 2/1969 | Keyworth | F01B 3/106 137/83 |
| 3,447,111 | A * | 5/1969 | Kubilos et al. | 335/230 |
| 3,464,318 | A * | 9/1969 | Garnjost et al. | 137/625.62 |
| 3,473,547 | A * | 10/1969 | Coakley | 137/83 |
| 3,473,548 | A * | 10/1969 | Erickson et al. | 137/85 |
| 3,477,472 | A * | 11/1969 | Mercier | 137/625.62 |
| 3,485,255 | A * | 12/1969 | Flippo | 137/83 |
| 3,498,308 | A * | 3/1970 | George et al. | 137/85 |
| 3,500,082 | A * | 3/1970 | Tolegian | H01H 29/20 200/302.3 |
| 3,532,121 | A * | 10/1970 | Sciortino et al. | 137/625.4 |
| 3,542,051 | A * | 11/1970 | McFadden et al. | 137/83 |
| 3,552,433 | A * | 1/1971 | Mason | 137/625.62 |
| 3,555,969 | A * | 1/1971 | Shah | 137/625.62 |
| 3,556,150 | A * | 1/1971 | King | 137/625.4 |
| 3,561,474 | A * | 2/1971 | Langley | 137/557 |
| 3,587,016 | A * | 6/1971 | Coakley | 137/82 |
| 3,592,234 | A * | 7/1971 | Baltus | 137/625.62 |
| 3,678,951 | A * | 7/1972 | Coakley | 137/83 |
| 3,683,749 | A * | 8/1972 | Bayles | 91/438 |
| 3,693,916 | A * | 9/1972 | Tritt et al. | 137/625.64 |
| 3,712,339 | A * | 1/1973 | Bartholomaus et al. | 137/625.62 |
| 3,759,485 | A * | 9/1973 | Mills | 251/129.03 |
| 3,777,784 | A * | 12/1973 | Nicholson | 137/625.62 |
| 3,814,131 | A * | 6/1974 | Takahashi et al. | 137/625.62 |
| 3,877,486 | A * | 4/1975 | Merrell | F15C 1/04 137/831 |
| 3,906,416 | A * | 9/1975 | Sprando | H01H 50/16 335/125 |
| 3,910,314 | A * | 10/1975 | Nicholson | 137/625.62 |
| 3,922,955 | A * | 12/1975 | Kast | 137/625.62 |
| 3,946,757 | A * | 3/1976 | Wallace | 137/85 |
| 4,054,154 | A * | 10/1977 | Mason | 137/625.62 |
| 4,176,586 | A * | 12/1979 | Stoll et al. | 92/5 R |
| 4,214,237 | A * | 7/1980 | Zissimopoulos | A61M 5/16809 137/554 |
| 4,227,443 | A * | 10/1980 | Toot | 137/625.62 |
| 4,254,688 | A * | 3/1981 | Richter | 91/365 |
| 4,307,329 | A * | 12/1981 | Taylor | 318/587 |
| 4,333,498 | A * | 6/1982 | Huling | 137/625.62 |
| 4,456,031 | A * | 6/1984 | Taplin | 137/625.62 |
| 4,518,937 | A * | 5/1985 | Parker | 335/229 |
| 4,567,813 | A * | 2/1986 | Garnjost | 91/363 A |
| 4,576,198 | A | 3/1986 | Coakley et al. | |
| 4,624,284 | A * | 11/1986 | Lembke | 137/625.62 |
| 4,668,928 | A * | 5/1987 | Davis | H01H 51/2227 335/234 |
| 4,727,344 | A * | 2/1988 | Koga | H01F 7/1646 335/229 |
| 4,742,678 | A * | 5/1988 | Bartholomew et al. | 60/516 |
| 4,793,377 | A * | 12/1988 | Haynes et al. | 137/625.65 |
| 4,794,941 | A * | 1/1989 | Godon | F15B 13/0438 137/625.64 |
| 4,907,615 | A * | 3/1990 | Meyer et al. | 137/625.62 |
| 4,922,852 | A * | 5/1990 | Price | B05B 13/0431 118/323 |
| 4,997,002 | A * | 3/1991 | Blatter et al. | 137/82 |
| 5,085,125 | A * | 2/1992 | Emo et al. | 137/625.65 |
| 5,088,383 | A * | 2/1992 | Wardle et al. | 91/361 |
| 5,156,189 | A * | 10/1992 | Tranovich | 137/625.63 |
| 5,174,718 | A * | 12/1992 | Lampeter et al. | 416/48 |
| 5,244,002 | A * | 9/1993 | Frederick | 137/625.64 |
| 5,303,727 | A * | 4/1994 | Wilson et al. | 137/83 |
| 5,465,757 | A * | 11/1995 | Peters | F15B 13/0438 137/625.65 |
| 5,553,827 | A * | 9/1996 | Perkey | G05D 7/0635 137/625.63 |
| 5,624,100 | A * | 4/1997 | Bolte et al. | 251/65 |
| 5,709,245 | A * | 1/1998 | Miller | 137/625.64 |
| 5,899,064 | A * | 5/1999 | Cheung | 91/363 A |
| 5,949,315 | A * | 9/1999 | Kalb | H01H 51/2209 335/179 |
| 6,116,571 | A * | 9/2000 | Hettinger | 251/129.2 |
| 6,151,897 | A * | 11/2000 | Baumbick | 137/625.62 |
| 6,173,939 | B1 * | 1/2001 | Dottavio et al. | 251/129.12 |
| 6,199,588 | B1 * | 3/2001 | Shapiro | 137/625.65 |
| 6,367,250 | B1 * | 4/2002 | Baumbick | 137/625.62 |
| 6,460,558 | B2 * | 10/2002 | Anderson | 137/625.61 |
| 6,648,014 | B2 * | 11/2003 | Takahashi et al. | 137/625.62 |
| 6,755,205 | B1 * | 6/2004 | Hoemke et al. | 137/82 |
| 6,786,236 | B2 * | 9/2004 | Jansen | 137/625.64 |
| 6,874,468 | B2 * | 4/2005 | Watanabe | 123/377 |
| 7,093,607 | B2 * | 8/2006 | Rodriguez et al. | 137/625.62 |
| 7,210,500 | B2 * | 5/2007 | Achmad et al. | 137/625.62 |
| 7,290,565 | B2 * | 11/2007 | Achmad | 137/625.61 |
| 7,455,074 | B2 * | 11/2008 | Shelby et al. | 137/625.63 |
| 7,458,394 | B2 * | 12/2008 | Achmad et al. | 137/625.62 |
| 7,475,537 | B2 * | 1/2009 | Spickard | 60/403 |
| 7,475,607 | B2 * | 1/2009 | Oboodi et al. | 73/862.639 |
| 7,631,663 | B2 * | 12/2009 | Rauch et al. | 137/625.62 |
| 7,926,512 | B2 * | 4/2011 | Spickard et al. | 137/625.64 |
| 8,302,629 | B2 * | 11/2012 | Hattori | 137/625.62 |
| 8,418,722 | B2 * | 4/2013 | Grancher | G05D 16/2093 137/625.61 |
| 8,733,398 | B2 * | 5/2014 | Henson | F01D 21/00 123/198 DB |
| 8,967,179 | B2 * | 3/2015 | Ozzello | 137/83 |
| 2003/0178073 | A1 * | 9/2003 | Jansen | 137/625.64 |
| 2004/0221896 | A1 * | 11/2004 | Ballenger et al. | 137/554 |
| 2012/0172710 | A1 * | 7/2012 | Anthony | A61B 5/6843 600/411 |

* cited by examiner

METHOD OF DETECTING FAILURE OF A SERVO-VALVE, AND A SERVO-VALVE APPLYING THE METHOD

The present invention relates to a method and a device for detecting failure of a two-stage flow servo-valve in which the movable member for distributing power is connected to the rotor of the torque motor of the pilot stage by mechanical feedback. The invention also provides a servo-valve including such a device.

STATE OF THE ART

A conventional servo-valve is constituted by a pilot stage of the oscillating or deflected jet type or of the nozzle type with a flapper controlling a movable power distribution member of the power stage. The function of the power stage is to deliver a pressure or a flow proportional to an instruction delivered to the pilot stage.

In such servo-valves, the relative position of the hydraulic emitter (nozzle or ejector) and of the hydraulic receiver (stationary flapper, deflector, or receiver) of the pilot stage gives rise to pressure differentials that are used for finely moving the movable power distribution member of the power stage of the servo-valve. Generally, the position of the hydraulic emitter or receiver is controlled by a torque motor that moves one of the facing hydraulic elements of the pilot stage (the flapper for flapper-nozzle servo-valves, the ejector for movable ejector servo-valves, and the deflector for stationary ejector servo-valves). In response to a request from a user, a computer sends an instruction in the form of an electric current to the torque motor. This instruction causes the rotor of the torque motor to turn relative to the stator, which modifies the relative position of the hydraulic emitter and receiver, thereby giving rise to a pressure difference across the movable power distribution member of the power stage. This then moves by an amount that is substantially proportional to the electrical instruction received by the torque motor. The movement of the movable power distribution member then puts a set of drilled channels into communication with openings that are in an arrangement that allows a pressure or a flow to be delivered as a function of the movement of said power distribution member. When the desired effect has been obtained (generally the positioning of an element that is driven by an actuator connected to the power stage of a servo-valve), the computer sends a stop instruction, with the servo-valve then stopping delivery of pressure or flow. Control loops between the movement of the actuator and the instruction given to the servo-valve are generally established via the computer.

Such servo-valves usually include a mechanical connection between the rotor of the torque motor and the movable power distribution member, e.g. referred to as a "feedback" rod. It is generally installed in the middle of the movable element and is also secured to the flapper or the ejector.

Such servo-valves are in widespread use in aviation, in particular for the flight controls or for steering one or more wheels.

Since the function of those members is critical, it is important for airplane safety to be able to monitor that the operation of servo-valves is satisfactory, and thus warn the on-board computer in the event of a failure, even before the faulty operation of the servo-valve gives rise to a perceptible malfunction of the hardware it controls. The pilot or the system can then disconnect the equipment that has been identified as faulty and activate redundant equipment, if any.

Conventionally, following a request from the pilot, the on-board computer issues an instruction to the torque motor for it to generate a pressure or a flow adapted to achieving the desired movement of a hydraulic element. The computer also receives information enabling it to verify that the desired movement has taken place correctly.

Faults that might affect the servo-valve all have an impact on the position of the movable power distribution member. Mention may be made in particular of the following failures:

a) a slide in an end-of-stroke position causes the servo-control to lurch rapidly; the feedback rod is broken, certain packing gaskets are extruded, . . . ;

b) a blocked slide causing a more or less sudden lurch depending on the flow rate at which the slide became blocked: swarf jammed between the packing and the slide;

c) interruption of the hydraulic feed to the pilot stage: cracking in structural parts, clogging of the hydraulic feed to the first stage; and d) interruption of electrical power: breakage of the two coils, breakage of power supply wires. Detecting this type of failure usually depends on the monitoring device of the computer.

Lurching of the servo-control is perceived as a faulty state of the hardware it controls, such as an actuator, which takes up position quickly and suddenly in one of its extreme positions. For example, for an actuator, the servo-control lurching gives rise to the actuator rod moving rapidly either to its "fully extended" position or to its "fully retracted" position. The servo-valve in the servo-control loop is also on a faulty state, possibly one of the states a) to d) mentioned above, in which it delivers an output flow or pressure that is different from that required as a result of the distribution slide of the power member being in the wrong position.

Measuring a position error of the movable power distribution member between the position requested by the computer and its actual position reveals malfunction of the servo-valve.

At present, the position of the movable power distribution member is determined by a passive linear movement sensor of the linear variable differential transformer (LVDT) type. In order to be able to operate, that type of sensor requires an electronics module, referred to as a "conditioner". Such sensors have the advantage of being simple in structure, and of being capable of operating in environments that are extremely difficult while also having good resolution. Nevertheless, incorporating a sensor of that type in a servo-valve raises the following problems:

- the size of the servo-valve is increased by 10% to 50% depending on the model;
- the weight of the servo-valve is increased by 5% to 20%. This effect is particularly harmful in aviation applications where it is essential for equipment to be light in weight;
- the cost of the servo-valve fitted in this way is 5% to 20% greater than that of a servo-valve that is not so fitted;
- the mean time between failures is increased by 10% to 20%; and
- the need of a conditional processing the signal from the sensor further penalizes the aspect of size, weight, cost, and reliability.

OBJECT OF THE INVENTION

An object of the invention is to propose a simple method of detecting failure of a two-stage servo-valve having mechanical feedback.

SUMMARY OF THE INVENTION

To this end, the invention provides a method of detecting a failure of a servo-valve having a power stage with a movable member for distributing power and a pilot stage that includes a torque motor, the torque motor having a stator and a rotor that occupies a position that is controlled in order to move the movable member for distributing power in controlled manner, said movable member for distributing power being connected to the rotor of the torque motor by a mechanical feedback, the method of the invention including detecting the movable portion of the motor engaging a stop and generating a malfunction signal in response to such detection.

The method is based on detecting a discrete state: the rotor engaging a stop. This type of state can be detected by means that are simple, such as dry contacts or contactless sensors (e.g. of the magnetic type). Those detection means are selected depending on the nature of the detection circuit that is to be implemented, in particular in terms of its sensitivity to being disturbed by its surroundings or of the capacities of the computer to process the signal that is generated. The simplicity of these means may also have an effect of improving the reliability of the device, and also of reducing its cost and weight. It is possible to fit an existing servo-valve with a device that is particularly robust and reliable and that is suitable for generating a malfunction signal that is clear and fast, for little extra cost and extra weight.

The inventors have observed that faulty operation of a servo-valve usually leads to the rotor of the torque motor engaging a stop.

On failure of the servo-valve, the on-board computer issues a correcting instruction (increasing/reducing/stopping hydraulic feed) concerning the servo-valve. This gives rise to an electromagnetic torque being applied to the rotor so long as the hydraulic element has not performed the desired movement. Thus, in the event of the servo-valve failing, since a constant torque is applied to the rotor, it engages one of its stops given that the elements connected to the rotor are sufficiently flexible to allow such movement.

The invention also provides a servo-valve provided with means for implementing such a method.

Other characteristics and advantages of the invention appear on reading the following description of particular, non-limiting embodiments of the invention.

BRIEF DESCRIPTION OF THE DRAWINGS

Reference is made to the accompanying drawings, in which.

DETAILED DESCRIPTION OF AT LEAST ONE EMBODIMENT OF THE INVENTION

Figure 1:
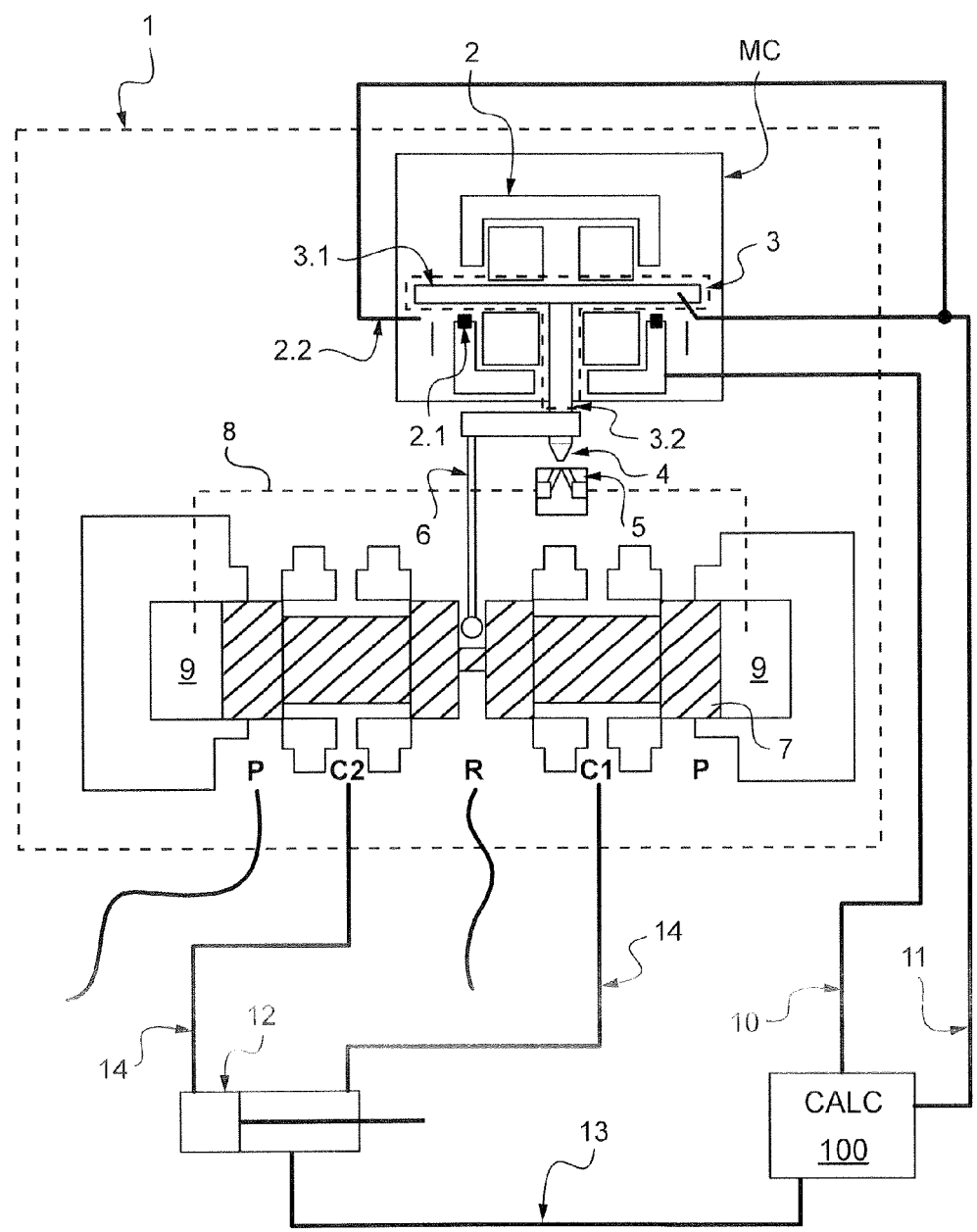
FIG. 1 is a diagrammatic view of a servo-valve in a configuration without malfunction.

FIG. 1 is a functional diagram of a servo-valve given overall reference 1. The valve may be incorporated in a control circuit for controlling hydraulic equipment such as an actuator 12 for controlling a flap on an airplane wing. The servo-valve includes a torque motor referenced MC.

The servo-valve 1 has a pilot stage and a power stage. The pilot stage comprises a torque motor MC that is moved under control of a computer 100 that transmits its instructions to the torque motor MC via an instruction channel 10. The power stage is connected to a hydraulic power supply P, a return port R, and to two outlets C1 and C2. The outlets C1 and C2 feed the two chambers of a double-acting actuator 12 via pipes 14. The computer 100 receives information from the torque motor via an operation-monitoring channel 11 and also information about the position of the actuator via an information channel 13.

The torque motor MC comprises a stator 2 and a rotor 3. The stator 2 is a cage that surrounds the rotor 3 and that has magnetic stops 2.1 for receiving the rotor in its extreme positions. The rotor 3 comprises two main elements:
  a magnetic flapper 3.1 acted on by the magnetic field developed by the stator and movable relative to the body of the servo-valve 1; and
  a column 3.2 projecting from the stator and penetrating into the inside of the body of the servo-valve.

The rotor 3 is secured to a fluid ejector 4 that faces a stationary receiver 5. The ejector 4 selectively directs a hydraulic fluid as a function of the movement of the rotor 3. A mechanical return in the form of a feedback member such as a feedback rod 6 mechanically connects the movable member for distributing power—the slide 7—to the volume column 3.2.

Stop-engagement detectors, in this example in the form of normally-open switches 2.2, are arranged close to the magnetic stops 2.1 and they are arranged in such a manner as to be actuated by the end of the magnetic flapper 3.1 when the rotor 3 comes into abutment. They communicate with the computer 100 via the operation-monitoring channel 11. The stationary receiver 5 has two channels 8, shown diagrammatically, that lead into the chambers 9 situated on either side of the slide. A movement of the rotor 3 moves the ejector 4 relative to the deflector 5. Two different streams are then directed via the channels 8 into the chambers 9 situated on either side of the slide 7. These streams create a pressure differential in the chambers 9, thereby causing the slide 7 to move in translation and act via the pipes 14 to output a flow from the servo-valve 1 to the actuator 12 that is substantially proportional to the control current applied to the input of the torque motor MC.

Figure 2:
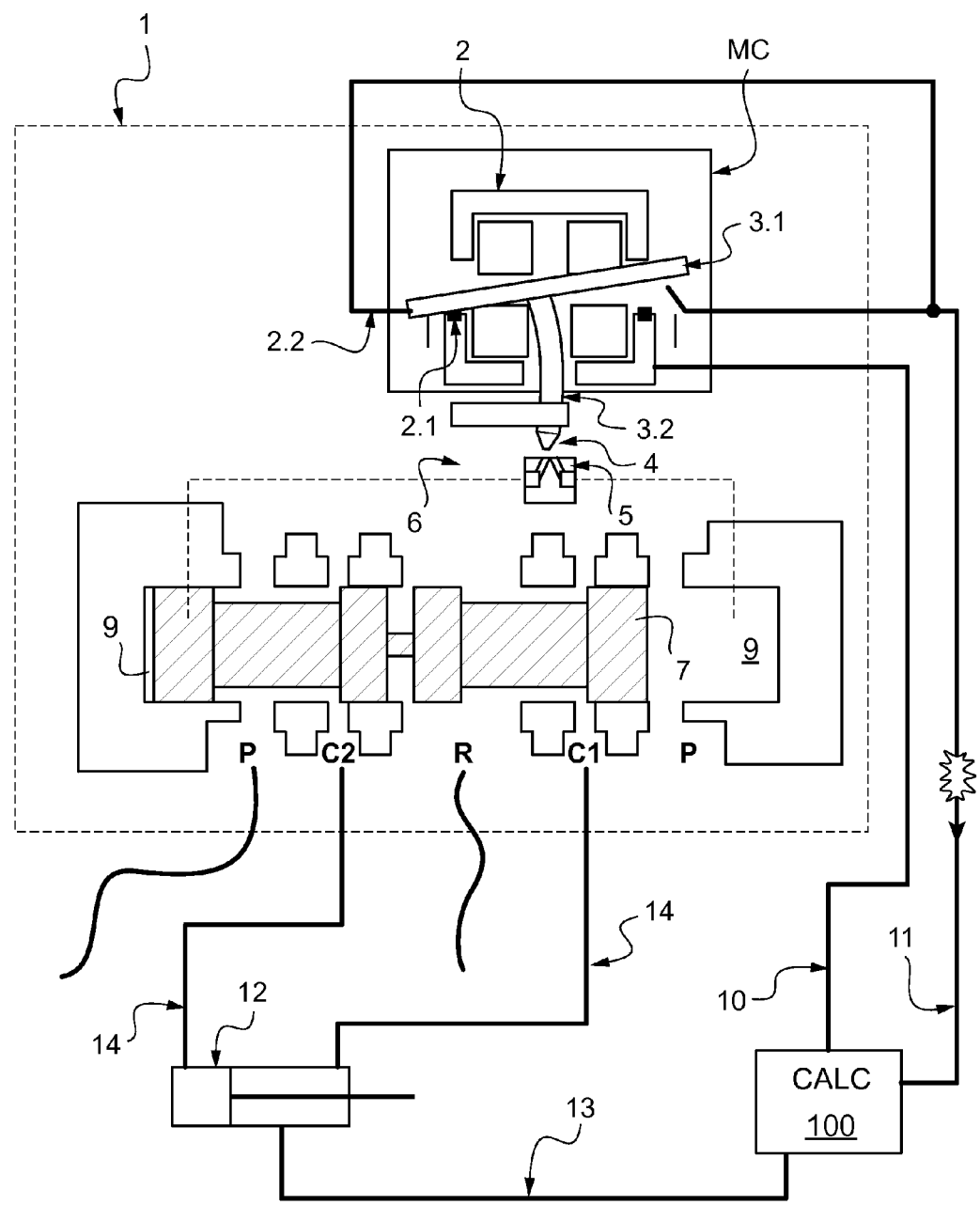
FIG. 2 is a diagrammatic view of a servo-valve in a configuration with malfunction.

FIG. 2 shows the servo-valve 1 in an anomalous condition, in this example the feedback rod 6 has broken. In this situation, the slide 7 will immediately come into abutment against the end of one or the other of the chambers 9, causing the servo-valve to lurch. A large flow is then delivered by the servo-valve 1 to the actuator 12 via the pipes 14. On being informed of the movement of the actuator 12 by means of the information channel 13, the computer 100 sends a correcting instruction to the servo-valve via the instruction channel 10. This takes the form of a current that is applied to the torque motor MC for the purpose of causing the flapper to move in a direction enabling the actuator 12 to perform the desired return movement. This correcting instruction is maintained so long as the actuator 12 has not moved in compliance therewith. Since it is subjected by the stator 2 to a constant magnetic torque, the magnetic flapper 3.1 of the rotor 3 comes against one of the magnetic stops 2.1 and closes one of the switches 2.2. In response to this engagement of a stop, the closure of this circuit generates a malfunction signal on the operation-monitoring channel 11. It may be useful to add a timeout or a filter on detecting closure of one of the switches 2.2, since high flow demand can give rise to the rotor 3 briefly engaging a stop. Nevertheless, the fast dynamic response of the first stage means that the speed with which the device of the invention detects a malfunction is of the same order as the speed of a system including an LVDT type sensor on the servo-valve slide.

The malfunction signal may trigger a warning for the airplane pilot or it may be processed directly by the computer, which may decide to apply a safety procedure consisting in deactivating the faulty servo-valve and activating redundant equipment, if any.

Naturally, the invention is not limited to the embodiments described but covers any variant coming within the ambit of the invention as defined by the claims.

In particular:
- the servo-valve may be a servo-valve that delivers a pressure setpoint;
- the rotor 3 engaging a stop may be detected by sensors of other types, such as for example an inductive sensor, a normally-open or normally-closed switch, a piezometric sensor, a resistive sensor, or indeed measuring the resistance between the stator and the rotor;
- engagement with a stop may be detected in any location of the system, e.g. by measuring twisting of the column 3.2;
- the stop-engagement sensors 2.2 may be carried by the rotor itself, thereby enabling a compact element to be provided;
- the stop-engagement sensors 2.2 may be carried by the stator 2 itself, thereby enabling a compact element to be provided, in particular by taking the place of the magnetic stops 2.1;
- the stop-engagement sensors 2.2 may be positioned inside or outside the cage of the stator 2;
- the torque motor MC may apply a twisting force to the rotor 3;
- the instruction channel 10 and the operation-monitoring channel 11 may be the same channel (multiplexing);
- a circuit connected in parallel with the stop-engagement detectors and closing in the event of no feed current to the coils may be added to the device; and
- although the invention in this example relates to a torque motor having a stationary portion in the form of a stator and a movable portion in the form of a rotor, the invention applies equally well to a linear motor in which a stationary portion moves a movable portion in translation.

What is claimed is:

1. A method of detecting a failure of a servo-valve having a power stage with a movable member for distributing power and a pilot stage that includes a motor having a stationary portion and a movable magnetic flapper that occupies a position that is controlled in order to move the movable member for distributing power in controlled manner, said movable member for distributing power being connected to the movable magnetic flapper of the motor by a feedback member, the method including detecting the movable magnetic flapper of the motor engaging a magnetic stop in response to the closing of a switch and generating a malfunction signal in response to such detection,
wherein the malfunction signal indicates that the servo-valve is not functioning properly.

2. A method according to claim 1, wherein the movable magnetic flapper engaging the stop is detected by the switch operationally connected to the movable magnetic flapper of the motor in such a manner as to change state when the movable magnetic flapper of the motor engages the magnetic stop, with the change in state generating the malfunction signal.

3. A method according to claim 1, wherein the detecting includes the movable magnetic flapper engaging the magnetic stop to close the switch located adjacent to the magnetic stop, the switch is a dry contact or contactless switch.

4. A servo-valve comprising a power stage with a movable member for distributing power and a pilot stage that includes a motor having a stationary portion and a movable magnetic flapper that occupies a position that is controlled in order to move the movable member for distributing power in controlled manner, said movable member for distributing power being connected to the movable magnetic flapper of the motor by a feedback member, wherein the servo-valve is fitted with a detector for detecting the movable magnetic flapper of the motor engaging a magnetic stop, the detector includes a switch which, when closed, generates a malfunction signal,
wherein the malfunction signal indicates that the servo-valve is not functioning properly.

5. The method according to claim 1, further comprising deactivating the servo-valve in response to the malfunction signal indicating that the servo-valve is not functioning properly.

6. A servo-valve according to claim 4, wherein the switch is operationally connected to the movable magnetic flapper of the motor in such a manner as to change state when the movable magnetic flapper of the motor engages the magnetic stop.

7. The servo-valve according to claim 4, wherein the malfunction signal is generated in response to a break in the feedback member of the servo-valve.

* * * * *